US006189925B1

United States Patent
Reichtalhammer et al.

(10) Patent No.: US 6,189,925 B1
(45) Date of Patent: Feb. 20, 2001

(54) GAS GENERATOR

(75) Inventors: Georg Reichtalhammer, Freutsmoos; Karl-Heinz Sommer, Stockdorf, both of (DE)

(73) Assignee: TRW Airbag Systems GmbH & Co. KG, Aschau/Inn (DE)

( * ) Notice: Under 35 U.S.C. 154(b), the term of this patent shall be extended for 0 days.

(21) Appl. No.: 09/171,584

(22) PCT Filed: Apr. 28, 1997

(86) PCT No.: PCT/EP97/02184

§ 371 Date: Oct. 21, 1998

§ 102(e) Date: Oct. 21, 1998

(87) PCT Pub. No.: WO97/41007

PCT Pub. Date: Nov. 6, 1997

(30) Foreign Application Priority Data

Apr. 30, 1996 (DE) .............................. 196 17 249

(51) Int. Cl.⁷ .................................................. B60R 21/26
(52) U.S. Cl. ............................................................ 280/736
(58) Field of Search .................................. 280/736, 737, 280/738, 739, 740, 741, 742

(56) References Cited

U.S. PATENT DOCUMENTS

| | | | | |
|---|---|---|---|---|
| 4,943,086 | * | 7/1990 | Cunningham | 280/741 |
| 5,431,103 | * | 7/1995 | Hock et al. | 102/287 |
| 5,507,520 | | 4/1996 | Meduvsky et al. | |
| 5,611,566 | * | 3/1997 | Simon et al. | 280/736 |
| 5,635,665 | * | 6/1997 | Kishi et al. | 102/288 |
| 5,653,463 | * | 8/1997 | Jeong | 280/737 |
| 5,656,793 | * | 8/1997 | Ochi et al. | 149/22 |
| 5,829,785 | * | 11/1998 | Jordan et al. | 280/741 |

FOREIGN PATENT DOCUMENTS

| | | |
|---|---|---|
| 2538386 | 3/1976 | (DE) . |
| 3917460 | 10/1990 | (DE) . |
| 3939021 | 11/1990 | (DE) . |
| 4012893 | 10/1991 | (DE) . |
| 4141619 | 7/1992 | (DE) . |

* cited by examiner

*Primary Examiner*—Kevin Hurley
*Assistant Examiner*—Kevin McKinley
(74) *Attorney, Agent, or Firm*—Tarolli, Sundheim, Covell, Tummino & Szabo L.L.P.

(57) ABSTRACT

A gas generator for an airbag system of a vehicle comprises a combustion chamber to accommodate a propellant which is able to be activated. The combustion chamber has outflow openings for a gas which is generated after the propellant has been activated. The outflow openings are covered inside the combustion chamber by a filtering device. The filtering device is arranged spaced apart from the outflow openings. The filtering device divides the combustion chamber in axial or radial direction into a combustion space for the propellant or into one or more expansion chambers for the gas which is generated. The filtering process of the filtering device becomes more reproducible in the region of the outflow openings and is therefore improved. There is a better utilization of the filtering material and a greater lifespan of the filtering device is likewise achieved.

2 Claims, 1 Drawing Sheet

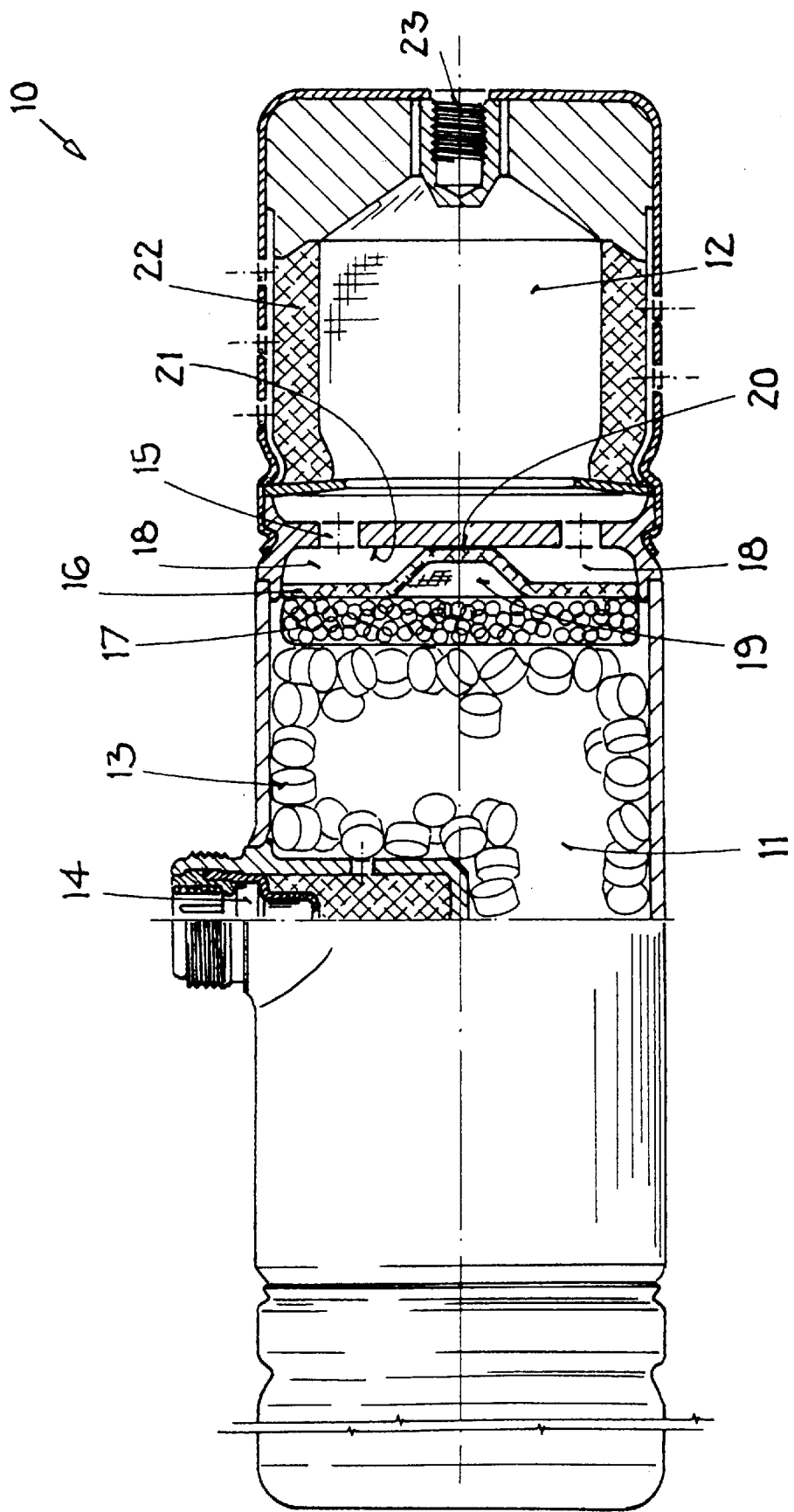

GAS GENERATOR

The invention relates to a gas generator for an airbag system of a vehicle, comprising a combustion chamber to accommodate a propellant which is able to be activated, which chamber has outflow openings for a gas which is generated after the propellant is activated, the outflow openings inside the combustion chamber being covered by a filtering device.

Such a gas generator has become known through the U.S. Pat. No. 4,561,675.

In the case of a hard impact of a motor vehicle, so-called gas generators of an airbag system generate gas to fill an airbag which then protects a vehicle occupant from impact onto hard interior parts of the vehicle such as the steering wheel or the side panels. These gas generators are generally of a pyrotechnic nature, so that through a current impulse by the sensor arrangement detecting a vehicle crash, an ignition unit is activated. The igniting of the so-called ignition charge generates hot particles which then strike onto the surface of a propellant which is generally present in tablet form, which then itself ignites and burns down in the so-called combustion chamber under a high pressure. Through the burning of the propellant, a gas is produced for filling the airbag. Since in addition to pure gas, fluid or solid components are also produced during combustion, corresponding filters are also provided in the housing of the gas generator, through which the gas stream is purified before emerging from the gas generator.

In the known gas generator, outflow openings are provided in a housing wall, through which the gas which is generated can flow out from the combustion chamber. Immediately in front of the outflow openings, there are filtering devices which cover the outflow openings and lie against the inner face of the housing wall of the combustion chamber. The known filtering device is constructed in two parts so that it is composed of two layers of different filtering material. The filtering device serves to prevent the outflow openings from being able to clog due to the propellant tablets. Furthermore, through the filtering device combustion residues are retained inside the combustion chamber.

Through the direct arrangement of the filtering device in front of the outflow openings, a reduction to the flow cross-section of the outflow openings occurs. This becomes all the more noticeable as it corresponds to the mesh width and the pore size of the filtering material of the filtering device, respectively. Basically, an impairment to the gas inflow into the outflow openings exists through the filtering material lying immediately in front of these.

Owing to the flow effect of the outflow openings, the filtering material is only flowed through in the region of the outflow openings. The remaining filtering material of the filtering device, on the other hand, is largely unused. Consequently, a high stressing of the filtering material occurs in the region of the outflow openings. In extreme cases, punching out or perforated patterns inside the filter material can occur. In these cases, the gas developing in the combustion chamber can flow out from the combustion chamber almost unhindered.

Generally, the filtering device is produced from a filtering material which is not flexible, but rather is rigid. In addition, the rigid filtering material lies firmly against the inner wall of the housing. Hence, the propellant tablets can not be accommodated so as to be padded or biased by the filtering device. Relative movements can occur between the individual propellant tablets, which cause noises (rattling).

From the U.S. Pat. No. 5,291,178 a further gas generator is known, in which likewise filtering devices are fastened directly in front of the outflow openings. To improve the temperature conditions in the region of the outflow openings, in this gas generator an additional dividing wall is provided, which keeps the propellant tablets away from the outflow openings. In the region of the dividing wall, further flow channels are constructed, which in turn are coupled with filtering systems, so that this gas generator is complicated in its construction. Through the direct arrangement of the filtering device in front of the outflow openings, this gas generator also has the above-mentioned disadvantages with regard to the flow conditions in the region of the outflow openings.

In other gas generators, therefore, simple grid networks are provided as a filtering device in front of the outflow openings. The disadvantages of these solutions lie in that through the grid networks, which likewise lie directly in front of the outflow openings, the effective flow cross-section is reduced depending on the wire thickness. Since for this reason the wire diameter can not be selected to be very great, the hot gas stream from the combustion chamber leads to the wire frequently melting directly in front of the outflow openings. Then hot metallic particles also arrive at the exterior. Likewise, in turn, only the parts of the wire grid network are stressed which are provided in the region of the outflow openings.

Through the DE 40 12 893 A1 therefore a technical teaching is proposed of securing several layers of steel wool in front of the outflow openings in a gas generator. The steel wool is of course in turn arranged directly in front of the outflow openings, so that here also in turn the same above-mentioned problems are to be found with regard to the flow cross-sections. Here, also, the parts of the steel wool which are situated in the region of the flow cross-sections of the outflow openings are stressed to an intensified extent.

It is therefore an object of the present invention to further develop a gas generator of the type initially mentioned such that the filtering process by the filtering devices in the region of the outflow openings becomes more reproducible and is improved, that a better utilization of the filtering material exists and a greater lifespan of the filtering device is achieved.

The problem is solved according to the invention in a surprisingly simple manner in that the filtering device is arranged spaced apart from the outflow openings, and that the filtering device divides the combustion chamber in axial direction or also in radial direction into a combustion chamber for the propellant and into one or more expansion chambers for the developing gas.

Through the spaced arrangement of the filtering device from the outflow openings, no reduction takes place of the flow cross-sections in the region of the outflow opening and the filtering material of the filtering device can be flowed through better. Consequently, the filtering material of the filtering device becomes more uniform and is utilized over the entire region of the filtering device. The utilization of the filtering material is only still determined here by the pore- or mesh size of the filtering material.

Owing to the more uniform flow processes inside the filtering device, an improved temperature distribution is brought about inside the filtering device. Therefore, individual partial regions of the filtering device can be prevented from being thermally stressed too intensively.

The filtering device now divides the combustion chamber into a combustion space and one or more expansion chambers. It is preferred to use a flexible or elastic filtering material for the filtering device. If in fact pressure peaks build up inside the combustion space, the filtering device can yield in the direction of the expansion chamber. Pressure peaks in the combustion space can be easily reduced thereby, so that a pressure relief is brought about. For example, the filtering device can be secured inside the combustion chamber only at the top and bottom so that the central region of the filtering device can bulge. It is also conceivable that the filtering device is arranged displaceably inside the combustion chamber, in order to be able to react to pressure changes.

Through the free space (expansion chamber) in front of the outflow openings, the utilizable flow cross-section of the filtering device is no longer influenced so greatly by the outflow openings lying behind it, as viewed in the direction of flow. The flow cross-section is almost identical in front of and after the filtering device, so that a substantially greater part of the surface of the filtering device is flowed through by the hot gas particles. Consequently at the same time, more particles are retained and the gas generator emits a smaller number of these particles to the exterior.

In a further embodiment of the invention, the filtering device is secured inside the combustion chamber such that the propellant lies in a flexible manner against a combustion chamber side of the filtering device. This leads to no relative movement of the propellant tablets being possible, which could lead to a noise development. Through the elastic abutment, the propellant tablets are held under a slight pre-stressing. If the filtering device is held movably inside the combustion chamber, the combustion chamber can be made smaller according to the number of propellant tablets which are still present. The size of the combustion chamber here can be adapted continuously to the number of propellant tablets.

In another embodiment, the filtering device consists of a grid network. The grid network is spaced apart from the outflow openings so that no reduction of the effective flow cross-section can take place through the wires of the grid network. Thereby, the wires can be constructed so as to be thicker, so that they no longer melt because of the hot gases and no wire particles can reach the exterior. A further advantage of this embodiment consists in that through the wire grid a flexible filtering device can easily be realized inside the combustion chamber for the reduction of pressure peaks.

To reduce the manufacturing costs, the grid network can be produced from a metallic or from a heat-resistant composite material. This leads to an embodiment which is sufficient for many cases of application.

In a particularly preferred embodiment, the filtering device has a bead aligned in the flow direction of the gas, the bead base of which comes to lie against an inner wall of the combustion chamber between the outflow openings. The bead divides the expansion chamber into an upper and a lower part. In this embodiment, the filtering device is fixed in position on the top or at the bottom of the combustion chamber and between the outflow openings. In the region of the outflow openings, this filtering device is flexible owing to the provided bead and is spaced apart from the outflow openings. For example, the wire grid described above does not come to lie directly in front of the outflow openings. The depth of the bead can be adapted to the functional requirements of the gas generator. However, other possibilities are also conceivable for ensuring the suitable distance from the outflow openings of the gas generator.

In a further development of this embodiment, the bead base is welded to the inner wall of the combustion chamber or is fastened by means of a heat-resistant adhesive. The fastening of the bead base ensures a permanent arrangement of the filter device fixed in position and hence ensures reproducible flow conditions.

It is particularly preferred that a combustion chamber filter is provided which is arranged between the propellant and the combustion chamber side of the filtering device. With this embodiment, a fine filter (combustion chamber filter) can be combined with a coarse filter (grid network). Both filtering devices are spaced apart from the outflow openings and have the above-mentioned advantageous characteristics.

When the outflow openings connect the combustion chamber with a filtering chamber, additional filtering means can be provided, in order to ensure almost completely that no hot gas particles at all can penetrate to the exterior.

In another variant, the outflow openings are constructed in the manner of a nozzle and preferably have an insert of metal. This improves the flow conditions of the gas out from the combustion chamber, because in this embodiment the flow is supported and a specific flow guidance is present.

A type of construction of the gas generator which is simple and easy to handle is achieved when the filtering device is produced with an oversize with respect to the size of the combustion chamber and is fixed in position in the region of the outflow opening by pressing in.

Further advantages of the invention will be apparent from the description and the drawing. Likewise, the features mentioned above and those further enumerated can each be used according to the invention individually on their own or severally in desired combinations. The embodiments shown and described are not to be understood as an exhaustive enumeration, but rather are examples for the description of the invention.

The invention is illustrated in an embodiment in the drawing and is explained in further detail with the aid of the following description. The FIGURE shows, in greatly diagrammatic form, an embodiment of a gas generator according to the invention and is not necessarily to be understood as being to scale.

The FIGURE shows a gas generator according to the invention, partially in a side view and partially in an axial longitudinal section.

The FIGURE shows a gas generator 10 which is composed substantially of a combustion chamber 11 and of a filter chamber 12 adjoining thereto. The housing of the gas generator 10 is composed of individual housing parts which are connected with each other. The housing parts are firmly connected with each other and consist of a heat-resistant material. Inside the combustion chamber 11 a propellant 13 is accommodated, which is present in tablet form.

If, in the case of a vehicle crash, a sensor (not illustrated in the FIGURE) directs a signal to an ignition unit 14, then inside the ignition unit 14 a so-called ignition charge is ignited. In this process, hot particles are produced and intensified, which strike onto the propellant 13 and likewise ignite it. Through the combustion of the propellant 13 a gas is produced which can leave the combustion chamber 11 through outflow openings 15 and can arrive via the filter chamber 12 into an airbag which is likewise not shown in the FIGURE. Then the airbag is inflated by the gas. The outflow openings 15 are spaced apart from a filtering device 16. The filtering device 16 serves to filter the emerging hot gas streams before leaving the combustion chamber 11. A combustion chamber filter 17 arranged in front of the filtering device 16 likewise serves to filter the gas stream. Owing to the distance of the outflow openings 15 from the filtering device 16, no reduction takes place of the effective flow cross-section through the filtering device 16. For example, the filtering device 16 can be constructed as a wire grid. Almost the entire filtering device 16 can have the hot gas flowing through it, so that individual partial regions of the filtering device 16 are prevented from being exposed to too great a thermal stress.

The filtering device 16 divides the combustion chamber 11 into a combustion space in which the propellant 13 is accommodated and into an upper and a lower expansion chamber 18. The expansion chambers 18 can become smaller on the occurrence of pressure peaks and thereby provide for a pressure relief.

The filtering device 16 has a bead 19, the bead base 20 of which lies against an inner wall 21 of the combustion chamber. The bead base 20 can also be additionally secured permanently to the inner wall. The bead 19 serves to bring about a distance between the filtering device 16 and the outflow openings 15. The depth of the bead 19 can be adapted to the functional requirements of the gas generator 10.

The gas generated inside the combustion chamber 11 can arrive via the outflow openings 15 into the filtering chamber 12, can be purified there by means of a filtering system 22 and can be cooled if necessary. The gas finally arrives into the airbag—which is not shown—via an opening 23.

What is claimed is:

1. A gas generator (10) for an airbag system of a vehicle, comprising a combustion chamber (11) to accommodate a propellant (13) which is able to be activated, which combustion chamber has a wall (21) which has outflow openings (15) for a gas which is generated after the propellant (13) is activated, the outflow openings (15) being covered inside the combustion chamber (11) by a filtering device (16), the filtering device (16) having a portion being arranged spaced apart from the outflow openings (15) and a portion (20) contacting the wall (21) so that a ring-shaped expansion chamber (18) is defined which flowingly connects the outflow openings (15), the gas generated flowing into the expansion chamber (18), the filtering device divides the combustion chamber (11) in axial or also in radial direction into a combustion space for the propellant (13), the expansion chamber being defined by a separated volume enclosed between the filtering device (16) and the combustion chamber walls, filtering device (16) being secured inside the combustion chamber (11) such that the propellant (13) lies against a combustion chamber side of the filtering device (16) and elastically deforms the filtering device (16) without contacting the outflow openings.

2. A gas generator (10) for an airbag system of a vehicle, comprising a combustion chamber (11) to accommodate a propellant (13) which is able to be activated, which combustion chamber has a wall (21) which has outflow openings (15) for a gas which is generated after the propellant (13) is activated, the outflow openings (15) being covered inside the combustion chamber (11) by a filtering device (16), the filtering device (16) having a portion being arranged spaced apart from the outflow opening (15) and a portion (20) contacting the wall (21) so that a ring-shaped expansion chamber (18) is defined which flowingly connects the outflow openings (15), the gas generated flowing into the expansion chamber (18), the filtering device (16) dividing the combustion chamber (11) in axial or also in radial direction into a combustion space for the propellant (13), t he filtering device being flexible under pressure in the regions of the outflow openings without contacting the outflow openings.

* * * * *